United States Patent Office 3,684,432
Patented Aug. 15, 1972

3,684,432
WEAK ACID SALTS OF HYDROXYLAMINE
John Henry Bonfield, Basking Ridge, N.J., assignor to Allied Chemical Corporation, New York, N.Y.
No Drawing. Filed Sept. 19, 1969, Ser. No. 859,585
Int. Cl. C01b 25/00
U.S. Cl. 423—284    2 Claims

ABSTRACT OF THE DISCLOSURE

Weak acid salts of hydroxylamine of the formula $NH_2OH \cdot HX$ wherein HX represents an acid or cation exchange resin having an acid dissociation constant of less than $1 \times 10^{-6}$. These salts are useful in the preparation of ketoximes from ketones, especially the preparation of cyclohexanone oxime from cyclohexanone.

CROSS REFERENCES TO RELATED APPLICATIONS

This application is related to copending application of John Henry Bonfield, "Preparation of Oxime" Ser. No. 859,298 filed Sept. 19, 1969.

This invention relates to novel hydroxylamine salts. More particularly, this invention relates to stable hydroxylamine salts of weak acids having a dissociation constant of less than $1 \times 10^{-6}$.

BACKGROUND OF THE INVENTION

Hydroxylamine is a well known reducing agent and is employed in the formation of oximes from aldehydes and ketones, particularly in the formation of cyclohexanone oxime from cyclohexanone, which oxime is a valuable precursor in the synthesis of ε-caprolactam. Since hydroxylamine is unstable, it is usually employed as an acid salt, generally the sulfuric acid salt. The acid which is liberated by the reaction of the acid salt with a ketone must be neutralized, as with ammonia, in order to obtain a high conversion to the desired oxime. The following equations, directed to cyclohexanone, are illustrative of this two-step reaction, wherein $NH_2OH \cdot HA$ represents the acid salt.

(1)
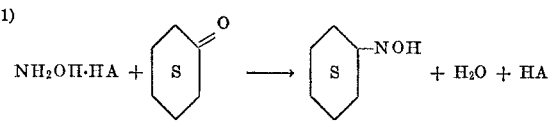

(2)    $HA + NH_3 + H_2O \longrightarrow NH_4A + H_2O$

Thus in addition to the desired oxime, the neutralization step also produces an ammonium salt, usually ammonium sulfate, as a by-product. Although widely used as a fertilizer, in recent years this salt has not been commercially attractive and poses a disposal problem. Therefore, a process for preparing oximes without formation of an inorganic salt by-product is desirable.

DESCRIPTION OF THE PRIOR ART

U.S. Pat. 3,429,920 to DeRooj discloses a process for preparing oximes from aldehydes or ketones and a hydroxylamine salt of acids having a dissociation constant of from $2 \times 10^{-1}$ to $2 \times 10^{-6}$ in the presence of a soluble salt of the same acid to form a buffer solution. The acid produced during the reaction is partly neutralized, and somewhat less salt is formed during the reaction than in the conventional sulfuric acid salt process. However, in order to produce a high yield of oxime, ammonia must still be added to form a nearly neutral solution and thus by-product salts are still formed. The patentee states that hydroxylamine salts of acids having dissociation constants of less than $2 \times 10^{-6}$ are unstable.

SUMMARY OF THE INVENTION

We have found unexpectedly that stable hydroxylamine salts of certain very weak acids, i.e., those having dissociation constants of less than $1 \times 10^{-6}$, can be prepared. These compounds are useful to form oximes from their corresponding ketones in high yield without the need for neutralization of the reaction mixture and the consequent formation of undesirable salts.

DETAILED DESCRIPTION OF THE INVENTION

The compositions of the invention have the formula (1)    $NH_2OH \cdot HX$ wherein HX represents a weak acid having a dissociation constant less than $1 \times 10^{-6}$. The compounds and their aqueous solutions or dispersions are stable on storage.

Weak acids suitable for use in preparing the compositions of the invention include for example boric acid (dissociation constant, hereinafter referred to as K, of $2 \times 10^{-10}$); carbonic acid (K, $4.3 \times 10^{-7}$, $K_2$ $5.6 \times 10^{-11}$); hydrocyanic acid (K $7.2 \times 10^{-10}$); hypochlorous acid (K $3.5 \times 10^{-8}$); phenol (K $1.3 \times 10^{-10}$); phenolphthalein (K $2 \times 10^{-10}$); stannic acid (K $4 \times 10^{-10}$); telluric acid ($K_1$ $6 \times 10^{-7}$, $K_2$ $2 \times 10^{-8}$); and the like. Weakly acid ion exchange resins can also form stable hydroxylamine salts, as for example Amberlite IRC-50, a cation exchange resin of Rohm and Haas Co. having free carboxyl groups, Zeo Karb 226 of Permutit Co., Ltd., Duolite CS-100 of Chemical Process Co. and equivalent cation exchange resins. Thus, the compositions described above are meant to include both hydroxylamine salts of weak acids and hydroxylamine salts of weakly acid ion exchange resins.

The hydroxylamine salts of the invention can be prepared readily and simply in conventional manner in various ways. They can be prepared directly from hydroxylamine by contacting an aqueous solution of hydroxylamine with the weak acid or weak acid resin or preferably, by conducting the hydroxylamine generating reaction in the presence of the weak acid or weak acid resin. Hydroxylamine can be generated in known manner by the reduction of nitroparaffins, by the electrolytic reduction of nitric acid, or by the catalytic reduction of oxides of nitrogen with hydrogen.

The hydroxylamine salts of Formula 1 can also be prepared from strong acid salts of hydroxylamine, as by reacting a strong acid salt with a weak acid in the presence of a reagent that will precipitate the strong acid liberated during the reaction as an insoluble salt, and filtering off the strong acid salt. This reaction is preferably carried out at ambient temperatures, but temperatures up to the reflux temperature of the solution can be employed if short residence times are used.

The hydroxylamine weak acid salt solution can be employed directly, without the need for isolating or further purifying the solution. However, if desired the weak acid hydroxylamine salts can be purified, as by removal of water and precipitation with an inert nonsolvent, such as methanol.

Hydroxylamine salts of weakly acid ion exchange resins can be prepared from strong acid salts by reacting the resin with an aqueous solution of the strong acid salt, adding a reagent, such as an alkali metal hydroxide, that will form a water soluble salt of the strong acid and separating the resin from the solution. The resin can be washed with water to remove any residual strong acid salt.

The compositions of the invention are useful as analytical reagents and as a stable source of hydroxylamine. They are particularly useful in the preparation of oximes from their corresponding ketones, because the resultant reaction mixture does not require neutralization to obtain a high yield of the oxime and thereby the formation of undesirable by-product salts is avoided. The weak acid liberated during the reaction can be recovered for recycle to form additional weak acid hydroxylamine salts of the present invention. The use of the present compositions in the formation of oximes is described more fully in a copending application of the present inventor entitled "Preparation of Oxime" Ser. No. 859,298, filed Sept. 19, 1968.

The invention will be further illustrated by the following examples, but the invention is not meant to be limited to the details disclosed therein. In the examples, all parts and percentages are by weight.

Example 1

A solution of 315.5 parts of barium hydroxide octahydrate in 750 parts of water was warmed to 70–80° C. and added to a solution containing 124 parts of boric acid and 164 parts of hydroxylamine sulfate $$[(NH_2OH)_2 \cdot H_2SO_4]$$

in 750 parts of water, also preheated to 70–80° C. The mixture was stirred for one-half hour and the precipitated barium sulfate filtered off. The filtrate was concentrated at 30–35 mm. pressure until crystallization began. The solution was warmed to redissolve the precipitate and the product precipitated with methanol. The precipitate was filtered, washed with methanol and dried.

The hydroxylamine borate product had the formula $NH_2OH \cdot H_3BO_3$ and an acid dissociation constant of $7.3 \times 10^{-10}$. Analysis showed the product contained 35.25% of hydroxylamine. The product was appreciably soluble in water and formed a 6.4% solution at 20° C., a 9.5% solution at 30° C. and a 14.0% solution at 40° C. These solutions were stable on storage. The product decomposed before melting.

Example 2

A mixture of 244 parts of an acrylic copolymer containing free carboxyl groups prepared as described in U.S. Patent 2,340,111 and available commercially as Amberlite IRC–50 from Rohm and Haas Co., having 5.0 meg./gm. of carboxyl groups and 100 parts of hydroxylamine sulfate in 800 parts of water were stirred together. When the salt was dissolved, 48.8 parts of sodium hydroxide as a 25% aqueous solution were added dropwise while stirring and cooling. After one hour, the resinous product was filtered and washed with water.

The resinous product (473 parts) was found to contain about 50% of theory of hydroxylamine.

Example 3

One hundred parts of hydroxylamine borate prepared as in Example 1 is dissolved in 900 parts of water and 98 parts of pure cyclohexanone is added while maintaining the temperature at 25–30° C. After a short induction period, a copious precipitate forms, which is filtered and washed with water.

A 98° yield of the cyclohexanone oxime product is obtained (111 parts) upon drying under vacuum.

The filtrate is treated with a glycerol-base titration to determine the amount of boric acid released during the reaction. Essentially quantitive yields are recovered. The boric acid is suitable for recycle to form additional hydroxylamine borate.

I claim:

1. A composition of the formula $NH_2OH \cdot HX$ wherein HX is boric acid.

2. An aqueous solution of the composition of claim 1.

References Cited

UNITED STATES PATENTS

| | | | |
|---|---|---|---|
| 2,749,217 | 6/1956 | Deutschman | 23—190 A |
| 3,429,920 | 2/1969 | De Rooij | 23—190 A |
| 3,226,446 | 12/1965 | Drain et al. | 260—621 R |
| 3,375,273 | 3/1968 | Drain et al. | 260—621 R |

OTHER REFERENCES

Kojod: "Acta Chemica Scandinavica," vol. 9, 1955, pp. 455–469.

Rheinboldt et al.: "Chemische Berechte," vol. 88, 1955, pp. 666–667.

HERBERT T. CARTER, Primary Examiner

U.S. Cl. X.R.

260—621 R, 621 P, 343.4; 423—387